J. K. WILLIAMS.
COMBINED PRESS AND VULCANIZER.
APPLICATION FILED JAN. 17, 1908.
933,868.
Patented Sept. 14, 1909.
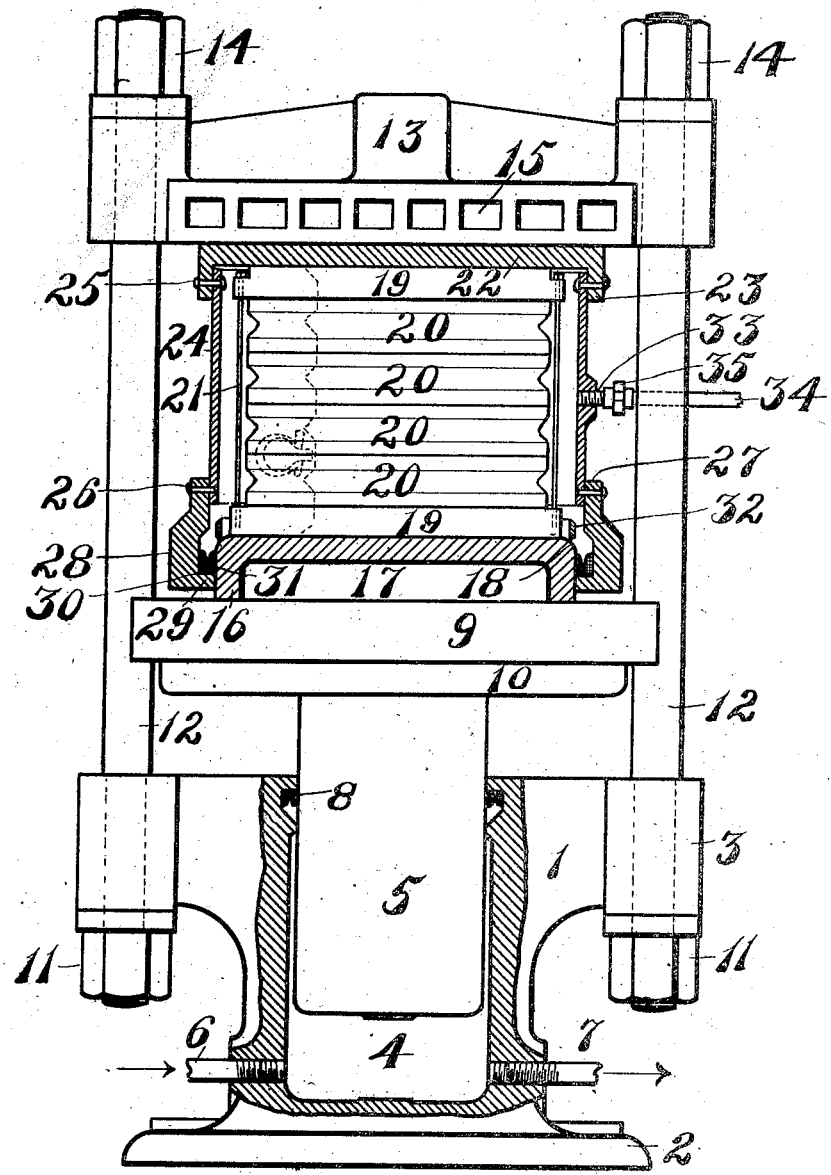
Witnesses:
Glenara Fox
A. E. Kling
INVENTOR—
John K. Williams,
BY C. E. Humphrey.
ATTORNEY.

UNITED STATES PATENT OFFICE.

JOHN K. WILLIAMS, OF AKRON, OHIO, ASSIGNOR OF ONE-HALF TO THE WILLIAMS FOUNDRY AND MACHINE COMPANY, A CORPORATION OF OHIO.

COMBINED PRESS AND VULCANIZER.

933,868.     Specification of Letters Patent.     Patented Sept. 14, 1909.

Application filed January 17, 1908. Serial No. 411,376.

*To all whom it may concern:*

Be it known that I, JOHN K. WILLIAMS, a citizen of the United States, residing at Akron, in the county of Summit and State of Ohio, have invented new and useful Improvements in Combined Presses and Vulcanizers, of which the following is a specification.

This invention relates to a combined press and vulcanizer for rubber articles, primarily adapted for use in vulcanizing vehicle tires, although the same will be found thoroughly applicable for use in connection with the vulcanization of other articles made from rubber in which is employed separable molds composed of two or more sections adapted to be tightly clamped together upon the article.

The invention further aims to provide a vulcanizing press in a manner as hereinafter set forth with means for properly inclosing the molds during the vulcanization of the articles contained therein to the end that the same may be heated by the introduction of a heating medium to the inclosure in which said molds are contained.

A further object of this invention is to provide a press in a manner as hereinafter set forth with means for simultaneously clamping the several sections of the molds together in such a way as to not become separated during the vulcanization of the articles contained therein and at the same time so construct the press that it will be capable of receiving a plurality of sections at each operation, said means being so constructed and disposed with respect to the inclosing element in which they are arranged that when they are under compression the same movement of the press will effectually seal the inclosing instrumentality in which the vulcanizing medium is contained.

Other advantages constituting objects of this invention will more fully appear in the description hereinafter set forth.

A practical embodiment of this invention is illustrated in the accompanying drawing, which is a view in side elevation of a press in accordance with this invention in connection with a plurality of rubber tire molds.

Referring to the drawing in detail, 1 denotes the base of the press provided with a laterally-extending foot portion 2. Extending from the sides of the base 1 are a plurality of integral laterally-extending arms 3 formed with vertical openings therethrough.

The central portion of the base 1 is provided with a vertical opening 4, in which is mounted a vertically-shiftable ram 5 constituting the movable member of the press. The cylinder 4 is provided with an inlet pipe 6 and an exhaust 7. In the cylinder 4 is a packing ring 8 for making the same fluid-tight. The ram 5 has a head 9 with a depending flange 10 which constitutes a stop for arresting the downward movement of the same. Positioned in the openings in the arms 3 and secured by means of nuts 11 are vertical rods 12 provided near their upper ends with shoulders. Mounted on the shoulders on the rods 12 is a fixed head 13 secured against movement by means of nuts 14. The head 13 is preferably cored out as at 15 for the purpose of reducing its weight. Positioned on the head 9 of the ram is a combined supporting and closure element comprising a plate 17 with a depending integral flange 16 with a rounded edge 18. Supported by the plate 17 is a nest of tire molds composed of upper and lower sections 19 and intermediate sections 20 temporarily united for ease in handling by means of bolts 21 extending between lugs on the two sections 19.

Arranged to inclose the nest of mold sections 19 and 20 and member 17 is a vulcanizer comprising a cover 22 provided with a depending integral annular flange 23, said cover resting on the upper mold section 19. Fitted within the flange 23 is a sheet-metal cylinder 24 secured thereto by bolts 25. Inclosing the lower portion of the cylinder 24 and secured by bolts 26 is an annular head 27 formed with an outwardly-flaring portion 28 from the lower portion of which extends inwardly an integral flange 29. The interior diameter of the opening inclosed by the flange 29 is slightly greater than the outer diameter of the flange 16 so that the flange 29 will pass over the member 17 freely for a purpose hereinafter set forth. The flange 29 forms with the outwardly-flaring portion 28 a shoulder 30 mounted on which is a packing ring 31 of such an internal diameter as to engage the outer vertical face of the flange 16. Resting on the member 17 is a loose ring 32 provided with a beveled outer face and having an external diameter the same as the flange 16, for a purpose to be hereinafter set forth. The cylinder 24 is preferably supplied with steam by an inlet pipe 33 detachably connected to a supply pipe 34 by means of a union coupling 35.

In use it is customary to provide a work bench or table (not shown) immediately adjacent the head 9 when it is lowered and in substantially a true plane with the upper surface thereof. The member 17 is placed on the work bench or table and the nested mold sections are mounted on the plate, after which the ring 32 is placed in the position shown in the drawings. The vulcanizer casing which comprises the cover 22, cylinder 24 and head 27 is then lowered over the nest of molds on the member 17 until the cover 22 rests on the upper mold section 19 and the head 27 with its packing ring is in engagement with the interior of the flange 16. The plate 17 with the vulcanizer casing and molds is then slid or moved laterally onto the head 19 of the ram 5. The head 9 and ram 5 are then raised by the introduction of an operating fluid through the inlet 6 into the cylinder 4 until the cover 22 of the vulcanizer engages the under face of the member 13 by which its further movement is arrested, but the head 9 and member 17 continue to move upwardly to firmly clamp the mold sections together, this being rendered possible by reason of the telescopic engagement between the head 27 and the flange 16, without interfering in any way with the vulcanizer. The parts will then be in the position shown in the drawing. The inlet pipe 33 is then connected with the supply pipe 34 by means of the union 35. Steam or other suitable heating medium is then introduced to the interior of the vulcanizer around the nest of mold sections to cure the article contained in the sections. When sufficient time has elapsed to properly cure the articles the supply pipe 34 is disconnected from the pipe 33 and the head 9 and ram 5 lowered. The member 17 is then removed from the head 9 to a suitable place and the vulcanizer portion lifted off and the mold sections are then accessible to the workman for removal. When the vulcanizer is lifted from the supporting member 17 the ring 32 will drop into the opening inclosed by the packing ring 31 and keep it in position and is again raised to the position shown in the drawing by the member 17 during the next operation of the press.

If desired instead of employing the union coupling 35 and supply pipe 34 and disconnecting them at each operation, a flexible hose may be used which can be permanently attached to the cylinder 24 and thereby avoid the necessity of detaching and uncoupling the pipes 33 and 34 at each operation of the press.

What I claim and desire to secure by Letters Patent, is:—

1. A device of the class described comprising a press, a vulcanizer independent thereof and bodily-removable laterally-therefrom composed of a casing and closure element adapted to be telescoped by the movement of said press, and a divided mold mounted within said vulcanizer on said closure element arranged to receive the clamping action of said press in unison with the telescoping of the parts of said vulcanizer.

2. A device of the class described comprising a press, a vulcanizer independent thereof and bodily-removable laterally-therefrom composed of a casing and a member adapted to telescope the casing and form a closure therefor by the movement of said press, and a divided mold mounted within said vulcanizer on said closure element arranged to receive the clamping action of said press in unison with the closing of said vulcanizer.

3. A device of the class described comprising a press, a vulcanizer independent thereof and bodily-removable laterally-therefrom composed of two parts, one constituting a receptacle and the other a closure therefor, the two parts of said vulcanizer adapted to be united telescopically by the movement of said press, and a divided mold mounted within said vulcanizer on said closure member arranged to receive the clamping action of said press in unison with the closing of said vulcanizer.

4. A device of the class described comprising a press, a vulcanizer bodily-removable laterally-therefrom composed of two parts, one of said parts constituting a receptacle, a packing ring carried by said part, the other part of said vulcanizer constituting a closure device adapted to telescope the other part by the movement of said press, and a divided mold mounted within said vulcanizer on said closure device arranged to receive the clamping action of said press in unison with the closing of said vulcanizer.

5. The combination with a press, of a vulcanizer bodily-removable laterally-therefrom, said vulcanizer composed of two parts, one constituting a receptacle and the other part adapted to seal the first part due to the movement of said press, a packing ring carried by one of the parts of said vulcanizer for causing a fluid-tight engagement between the parts thereof, and a divided mold arranged to be positioned within said vulcanizer on said sealing member and to receive the clamping action of said press in unison with the closing of said vulcanizer.

6. The combination in a device of the class described, of a press, a vulcanizer bodily-removable laterally-therefrom composed of two parts, one constituting a receptacle, the other a closure device therefor adapted to telescope the first part due to the movement of said press, a packing device carried by one of the parts of said vulcanizer arranged to form a fluid-tight joint between them, means to introduce a vulcanizing agent to the interior of said vulcanizer, and a divided mold positioned within said vulcanizer on said closure device arranged to receive the clamping action of said press in unison with the closing of said vulcanizer.

7. A device of the class described comprising a press arranged to clamp mold sections, a support for said mold sections carried by one of the members of said press, a vulcanizer inclosing said mold sections and telescoping said support, a packing ring to close the joint between said vulcanizer and support, and a ring when in its operative position arranged to support said packing ring and to be supported when in inoperative position by said mold section support.

In testimony whereof I have hereunto set my hand in presence of two subscribing witnesses.

JOHN K. WILLIAMS.

Witnesses:
 GLENARA FOX,
 C. E. HUMPHREY.